US012540923B2

(12) United States Patent
Osmanski et al.

(10) Patent No.: US 12,540,923 B2
(45) Date of Patent: Feb. 3, 2026

(54) ULTRASOUND PROBES AND APPARATUSES FOR ULTRASOUND IMAGING INCLUDING SUCH

(71) Applicants: ICONEUS, Antony (FR); INSERM (INSTITUT NATIONAL DE LA SANTÉ ET DE LA RECHERCHE MÉDICALE), Paris (FR); Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

(72) Inventors: Bruno-Felix Osmanski, Paris (FR); Thomas Deffieux, Paris (FR); Mathieu Pernot, Paris (FR); Adrien Bertolo, Ivry-sur-Seine (FR); Charlie Demene, Paris (FR)

(73) Assignees: ICONEUS, Antony (FR); INSERM (INSTITUT NATIONAL DE LA SANTÉ ET DE LA RECHERCHE MÉDICALE), Paris (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 265 days.

(21) Appl. No.: 18/269,158

(22) PCT Filed: Dec. 21, 2021

(86) PCT No.: PCT/EP2021/087169
§ 371 (c)(1),
(2) Date: Jun. 22, 2023

(87) PCT Pub. No.: WO2022/136481
PCT Pub. Date: Jun. 30, 2022

(65) Prior Publication Data
US 2024/0183824 A1 Jun. 6, 2024

(30) Foreign Application Priority Data
Dec. 22, 2020 (EP) .................................... 20306658

(51) Int. Cl.
*G01N 29/06* (2006.01)
*G01N 29/26* (2006.01)
*G01N 33/483* (2006.01)

(52) U.S. Cl.
CPC ......... *G01N 29/0654* (2013.01); *G01N 29/26* (2013.01); *G01N 33/4833* (2013.01); *G01N 2291/023* (2013.01); *G01N 2291/106* (2013.01)

(58) Field of Classification Search
CPC ............... G01N 29/0654; G01N 29/26; G01N 33/4833; G01N 2291/023;
(Continued)

(56) References Cited

U.S. PATENT DOCUMENTS 5,924,986 A * 7/1999 Chandler ............. A61B 5/0806
600/407
2007/0167823 A1 * 7/2007 Lee .......................... A61B 8/12
600/463

(Continued)

OTHER PUBLICATIONS

International Search Report issued in PCT/EP2021/087169 on Apr. 4, 2022 (4 pages).

(Continued)

*Primary Examiner* — Xin Y Zhong
(74) *Attorney, Agent, or Firm* — Osha Bergman Watanabe & Burton LLP

(57) ABSTRACT

An ultrasound probe includes a connector and a probe head that includes a mount located in a tip part of the probe head,
(Continued)

various linear matrices of transducers that emit acoustic waves with a given central wavelength and detect backscattered acoustic waves. The linear matrices are electrically connected to the connector, wherein each linear matrix from the linear matrices of transducers includes a first side along a first direction and a second side along a second direction. The second side is smaller than the first side. The linear matrices are fixed to the mount and juxtaposed on the mount with the first sides adjacent. Each linear matrix from the linear matrices of transducers is covered with a single cylindrical acoustic lens that focuses the acoustic waves emitted by the linear matrix. Each cylindrical acoustic lens includes a cylindrical axis substantially parallel to the first direction.

15 Claims, 9 Drawing Sheets

(58) Field of Classification Search
CPC ............ G01N 2291/106; A61B 8/0808; A61B 8/4477; A61B 8/4494; A61B 8/4461; A61B 8/483; G01S 7/52079; G01S 15/8925; G01S 15/8927; G01S 15/8945; G01S 15/8993; G01S 15/8918
See application file for complete search history.

(56) References Cited

U.S. PATENT DOCUMENTS

| | | | |
|---|---|---|---|
| 2008/0009741 A1* | 1/2008 | Hyuga | A61B 8/12 600/459 |
| 2017/0119342 A1* | 5/2017 | Tsuruno | G01S 7/52079 |
| 2018/0368810 A1* | 12/2018 | Sboros | A61B 8/5207 |
| 2021/0196228 A1* | 7/2021 | Raju | A61B 5/33 |

OTHER PUBLICATIONS

Written Opinion of the International Searching Authority issued in PCT/EP2021/087169 on Apr. 4, 2022 (11 pages).

Osmanski, B. et al.; "Functional ultrasound imaging of intrinsic connectivity in the living rat brain with high spatiotemporal resolution"; Nature Communications, vol. 5, No. 1, Oct. 3, 2014, pp. 1-14 (8 pages).

Gesnik, M. et al.; "3D functional ultrasound imaging of the cerebral visual system in rodents"; Neuroimage, vol. 149, Apr. 1, 2017, pp. 267-274 (18 pages).

Rabut, C. et al.; "4D functional ultrasound imaging of whole-brain activity in rodents"; Nature Methods, vol. 16, No. 10, Oct. 2019, pp. 994-997 (16 pages).

Sauvage, J. et al.; "4D Functional imaging of the rat brain using a large aperture row-col. array"; IEEE Transactions on Medical Imaging, vol. 39, No. 6, Dec. 16, 2019, pp. 1884-1893 (11 pages).

Montaldo, G. et al.; "Coherent Plane-Wave Compounding for Very High Frame Rate Ultrasonography and Transient Elastography"; IEEE Transactions on Ultrasonics, Ferroelectrics, and Frequency Control, vol. 56, No. 3, Mar. 2009, pp. 489-506 (18 pages).

* cited by examiner

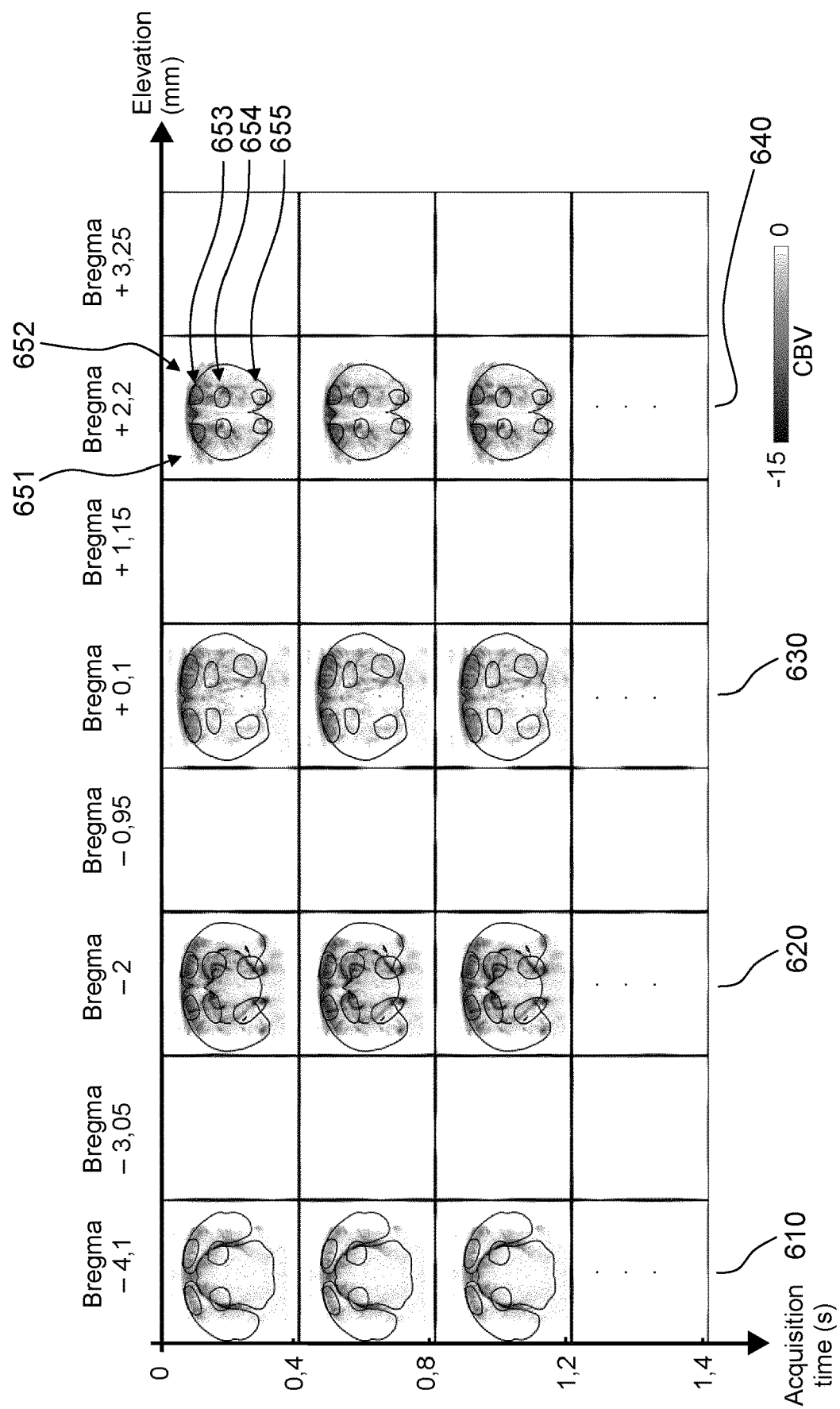

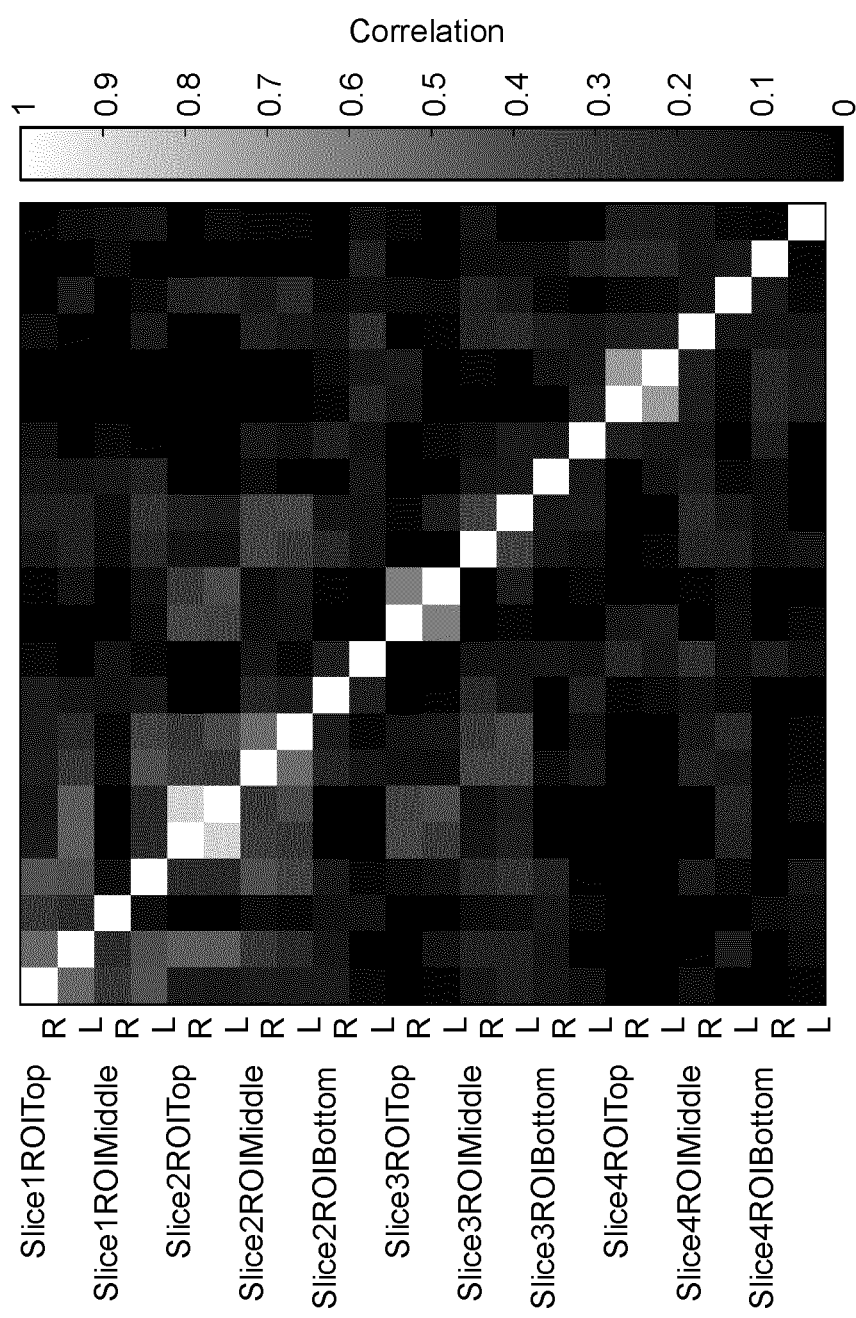

ULTRASOUND PROBES AND APPARATUSES FOR ULTRASOUND IMAGING INCLUDING SUCH

TECHNICAL FIELD OF THE INVENTION

The present disclosure relates to ultrasound probes and apparatuses for ultrasound imaging including such ultrasound probes. The present disclosure further relates to ultrasound imaging methods using such apparatuses and more specifically methods for brain functional ultrasound imaging (fUS).

BACKGROUND OF THE INVENTION

Functional ultrasound imaging (fUS) is a medical ultrasound technique for detecting or measuring changes in neural activities or metabolism, for example, the loci of brain activity, typically through measuring blood flow or hemodynamic changes.

More specifically, the fUS technique provides an indirect way for measuring neural activity through the neuro-vascular coupling. When a neuron is activated, its consumption of nutrients is more important and blood flows irrigating the neuron and its surroundings increase. This relationship between the local increase of blood flows and the activity of neurons is defined as the neuro-vascular coupling and provides a way to infer neural activity in an area of the brain from hemodynamic changes in this area (variations of blood flows and blood volume in brain vessels). In practice, the fUS technique provides images of brain areas from which can be extracted information on the blood flows which, in turn, leads to neural activity.

The fUS imaging technique uses ultrafast Doppler ultrasound imaging that can provide time-resolved images of an object, for example a biological sample, by probing (insonating) the sample with acoustic waves emitted via ultrasound probes and detecting acoustic waves that are backscattered by the sample.

Unlike conventional Doppler ultrasound imaging that probes the sample via a line-by-line process with acoustic waves insonating a portion of the sample, ultra-fast Doppler ultrasound imaging takes advantage of successive tilted plane wave transmissions that are coherently compounded to form images at high frame rates, also referred to as "Coherent Compound Beamforming". More specifically, the Coherent Compound Beamforming consists of the recombination of backscattered echoes from different illuminations achieved on the acoustic pressure field with various angles (as opposed to the acoustic intensity for the incoherent case). All images are added coherently to obtain a final compounded image. This very addition is produced without taking the envelope of the beamformed signals or any other nonlinear procedure to ensure a coherent addition. As a result, coherent adding of several echo waves leads to cancellation of out-of-phase waveforms, narrowing the point spread function (PSF), and thus increasing spatial resolution. Ultra-fast Doppler ultrasound imaging is suitable for very high acquisition rate, for example up to 20000 images per second and is more sensitive than conventional Doppler imaging. It is thus possible to measure blood flows in different types of vessels, including small brain vessels, i.e. vessels in which blood flows are less than about 1 mm/sec.

Monitoring the brain activity with the fUS technique may have different applications.

In some applications, fUS may be used to detect an increase in blood flows caused by a stimulus and thus to identify the areas of the brain activated by such stimulus. As a given stimulus leads to the same deterministic response signal (or "functional hyperhemia signal") in the brain, the different areas of the brain can be probed sequentially and the response signal to the stimulus may be reconstructed in the whole brain a posteriori.

In other applications, the brain activity is measured without stimulus, i.e. the brain is at rest but nevertheless animated by an intrinsic activity, referred to as "functional connectivity". This measurement of the functional connectivity can provide information on neural connections between different areas of the brain which can be used, and allows the detection for example of possible pathological conditions affecting these connections. The functional connectivity is generally measured by detecting correlations in variations of blood flows between different areas of the brain. The spatial dependence of the variations of blood flows in different areas of the brain is deterministic, however the time dependence of these variations in different areas is non-deterministic (random). Therefore, if two areas of the brain are not imaged at the same time or within a predetermined coherence time equal to about a few seconds, typically 3 seconds, the random time-fluctuations between the two areas make it impossible to measure the functional connectivity between these two areas.

In OSMANSKI, Bruno-Félix, PEZET, Sophie, RICOBA-RAZA, Ana, et al. *Functional ultrasound imaging of intrinsic connectivity in the living rat brain with high spatiotemporal resolution. Nature communications,* 2014, vol. 5, no 1, p. 1-14, an fUS technique was implemented to image the functional connectivity of a rat brain. The ultrasound probe used in the described fUS technique comprises a linear (1D) probe with a set of 128 piezoelectric transducer elements arranged in a linear matrix. Such linear probe is inherently restricted to the acquisition of a 2D image of a 2D plane of the sample, with a field of view proportional to the number of transducers.

However, there is a growing interest in methods suitable for increasing the field of view of fUS in order to monitor activity and connectivity in larger areas of the brain.

A 3D fUS imaging technique is described, for example, in GESNIK, Marc, BLAIZE, Kevin, DEFFIEUX, Thomas, et al. *3D functional ultrasound imaging of the cerebral visual system in rodents. NeuroImage,* 2017, vol. 149, p. 267-274. The described technique uses a linear probe and a translation stage to move the probe and scan multiple 2D planes of the sample. More precisely, the linear probe is moved at different positions and insonates the sample at each position. A 3D image is then calculated by combining the 2D images acquired at the different positions of the probe.

While this method can be applied to the imaging of functional hyperhemia comprising deterministic signals, it is not compatible with the imaging of functional connectivity. Indeed, the relationship between the signal (blood flows) in one plane of the sample and the signal in a second plane is lost when scanning due to the time delay between the acquisitions of the 2D images in the two different planes.

Alternatively, it has been proposed to use 2D ultrasound probes for implementing the fUS technique and directly obtain 3D images of the sample. For example, in RABUT, Claire, CORREIA, Mafalda, FINEL, Victor, et al. *4D functional ultrasound imaging of whole-brain activity in rodents. Nature methods,* 2019, vol. 16, no 10, p. 994-997, fUS is implemented with a two-dimensional fully-addressed array of transducers (FA probe). However, such an FA probe comprises a very high number of transducers that increases the complexity of the required driving electronics. For example, an FA probe with 32 transducers in each direction comprises $32^2=1024$ transducers that need to be independently controlled, meaning 1024 individual wires need to be connected in the probe. For comparison, a linear probe with the same field of view along one dimension would have only 32 transducers.

Further, in such an FA probe, transducers usually have surfaces smaller than the surfaces of transducers in a linear probe. Therefore, the acoustic impedance is higher and the acoustic signal in the sample weaker when compared to a linear probe, which results in a lower sensitivity.

In SAUVAGE, Jack, PORÉE, Jonathan, RABUT, Claire, et al. 4D *Functional imaging of the rat brain using a large aperture row-column array. IEEE Transactions on Medical Imaging*, 2019, it has been proposed to use a row-column addressed 2D ultrasound probe (RCA probe) to reduce the number of transducers in the probe and reduce the complexity of the driving electronics. An RCA probe comprises two overlapped and orthogonally oriented sets of transducer strips. In an RCA probe, every point in the sample can therefore be probed by using two orthogonal transducer strips, one acting as an emitter and the other acting as a receiver. The complexity of the wiring is then reduced compared to an FA probe. For example, an RCA probe with 32 transducers in each direction comprises 32 columns and 32 rows, meaning that only 64 transducers need to be independently connected to individual wires.

However, the inventors have shown that implementing fUS with RCA probes may suffer from a limited sensitivity since the strip geometry of the transducers induces parasitic sidelobes in the emitted acoustic waves.

The present disclosure relates to an ultrasound probe and an apparatus suitable for obtaining 3D images with the fUS technique and, in particular, for imaging the brain functional connectivity, while reducing the complexity of the driving electronics.

SUMMARY

In what follows, the term "comprise" is synonym of (means the same as) "include" and "contains", is inclusive and open, and does not exclude other non-recited elements. Moreover, in the present disclosure, when referring to a numerical value, the terms "about" and "substantially" are synonyms of (mean the same as) a range comprised between 80% and 120%, preferably between 90% and 110%, of the numerical value.

According to a first aspect, the present disclosure relates to an ultrasound probe comprising:
  a connector;
  a probe head comprising:
    a mount located in a tip part of said probe head;
    a plurality of linear matrices of transducers configured to emit acoustic waves with a given central wavelength and detect backscattered acoustic waves, said linear matrices being electrically connected to said connector, wherein:
      each linear matrix from said plurality of linear matrices of transducers comprises a first side along a first direction and a second side along a second direction, said second side being smaller than said first side;
      said linear matrices are fixed to said mount and juxtaposed on the mount with the first sides adjacent;
      each linear matrix from said plurality of linear matrices of transducers is covered with a single cylindrical acoustic lens configured to focus said acoustic waves emitted by the linear matrix, each cylindrical acoustic lens comprising a cylindrical axis substantially parallel to said first direction.

The original arrangement of the acoustic probe according to the first aspect of the present description is suitable for keeping an inter-distance between two linear matrices of transducers very small, typically inferior to about 30 times the central wavelength, which corresponds to about 3 mm for a central wavelength equal to about 0.1 mm. It is thus possible to simultaneously insonate different planes of the sample and calculate 2D images of the different planes from the backscattered acoustic waves, wherein the images planes are very close to each other. This allows an increase in the field of view of the reconstructed image without losing the time coherence between the acoustic waves backscattered by the sample, and while keeping a simple driving electronics and a good sensitivity.

According to one or further embodiments, the plurality of linear matrices comprises between 2 and 12 linear matrices, advantageously between 2 and 8 linear matrices.

In the present description, a "linear matrix of transducers" is understood as a one-dimensional arrangement of transducers.

In particular, a linear matrix of transducers may have different shapes. For example, the transducers may be arranged on a flat support or a curved support thus forming respectively a flat matrix or a curved matrix of transducers, the slope varying along the first direction.

Further, the linear matrices of the plurality of linear matrices may be manufactured individually or in a single piece.

According to the present description, each cylindrical acoustic lens is convex. In some embodiments, said cylindrical acoustic lens may also be concave. A section of each cylindrical acoustic lens may be circular, although not necessarily. Further, the cylindrical acoustic lenses configured to each cover a linear matrix form a plurality of cylindrical acoustic lenses that may be produced individually or in a single piece.

According to the present description, each linear matrix from said plurality of linear matrices of transducers is covered with a cylindrical acoustic lens and a cylindrical axis of each cylindrical acoustic lens is substantially parallel to the first direction of the first side. Thus, the cylindrical axis of each cylindrical acoustic lens follows the shape of the linear matrix and when the linear matrix of transducers is curved, the cylindrical axis of each cylindrical acoustic lens is also curved.

According to one or further embodiments, each single cylindrical acoustic lens comprises a plane of symmetry that is substantially orthogonal to the second direction.

According to the present description, the transducers can be of different types, for example a transducer based on the piezoelectric effect (referred to as piezoelectric transducer in the present description) or a capacitive micromachined ultrasound transducer (also known as CMUT).

According to the present description, the acoustic waves emitted by the transducers have a central wavelength comprised between about 0.025 mm and about 1.5 mm.

Each ensemble comprising one linear matrix and one acoustic lens allows for imaging of a section of the sample ("slice"). The dimensions of such section are: along the first direction, a dimension that depends on the length of the linear matrix along the first direction and its properties (e.g. curved matrix), along the second direction, an elevation length defined by the acoustic lens, and along the third direction, a dimension that depends on the size of the transducers along the second direction, the central wavelength and a focal distance of the acoustic lens.

According to one or further embodiments, the cylindrical acoustic lenses of two juxtaposed linear matrices are designed such that there is substantially no overlap in the sections defined by two ensembles comprising respectively each of the adjacent linear matrices and the corresponding acoustic lens. By "no overlap", it is meant that in each section defined by a given ensemble comprising one linear matrix and one acoustic lens, the ratio between an acoustic field produced by each other ensemble and the acoustic field produced by said ensemble is less than −6 dB, advantageously less than −12 dB. Disturbance between the signals emitted and received by each linear matrix after backscattering by the sample is thus avoided.

According to one or further embodiments, said cylindrical acoustic lenses have a focal distance equal to a value comprised between about 10 and about 200 times said central wavelength, advantageously between about 50 and about 100 times said central wavelength, i.e. typically between about 5 mm and about 10 mm for a central wavelength equal to about 0.1 mm.

According to one or further embodiments, the transducers of each of said linear matrices have a rectangular shape with a form factor between about 5 and about 50, advantageously between about 10 and about 30, wherein said form factor is a ratio of a length of a piezoelectric transducer according to the second direction to a length of a piezoelectric transducer along the first direction. The transducers of each linear matrix are for example arranged in a discontinuous strip extending along the first direction.

The resulting rectangular strip has been shown to provide a good resolution and contrast of the acquired images.

As a matter of fact, a short transducer length along the first direction is suitable for having a large density of transducers along the first direction (thereby increasing the image resolution according to the first direction); and a large transducer length along the second direction is compatible with using transducers with larger surfaces. Increasing the surface of the transducers reduces their impedance, which, combined with an acoustic lens to focus the acoustic waves emitted by the transducers, allows for the emission of an intense acoustic wave focussed in a plane, thereby contributing to increase the image contrast.

According to one or further embodiments, each of said linear matrices comprises between about 20 and about 300 transducers.

Such a number of transducers is suitable to have a sufficient field of view in order to image a sample, in particular a brain sample.

According to a second aspect, the present disclosure relates to an apparatus for ultrasound imaging of a sample comprising an ultrasound probe along the first aspect, e.g. an apparatus configured for functional imaging of a sample, for example the brain.

According to one or further embodiments, the apparatus for ultrasound imaging of a sample comprises:
the ultrasound probe according to the first aspect;
an electronic bay configured to receive electrical signals transmitted by said connector of said ultrasound probe and generate converted signals;
a computer configured to receive the converted signals from said electronic bay and generate imaging data from said converted signals, wherein said electrical signals result from the detection of the backscattered acoustic waves by the transducers of said plurality of linear matrices.

According to one or further embodiments, the apparatus further comprises a translation stage configured to translate said mount in a direction parallel to said second direction. In some embodiments, such translation stage may be incorporated directly within the ultrasound probe.

The translation stage allows for translating the linear matrices of transducers of the probe and thus successively insonating different parts of a sample. It is thus possible to further increase the field of view.

According to one or further embodiments, said translation stage is configured to translate said mount by a distance inferior or equal to the sum of an inter-distance between two juxtaposed linear matrices and a length of a transducer along the second direction. Such amount is sufficient to reconstruct an image of a sample with a limited number of "blind spots", such blind spots corresponding to parts of the sample that are not imaged but included between parts of the sample that are imaged. The move of the translation stage may be a step-by-step move in order to position the mount at a plurality of discrete positions, or it may be a continuous move.

According to a third aspect, the description relates to a method for ultrasound imaging of a sample using an ultrasound probe according to the first aspect. Such method can be implemented using an apparatus according to the second aspect.

In one or further embodiments, the method according to the third aspect comprises the steps of:
emitting acoustic waves and detecting backscattered acoustic waves using the transducers of the plurality of linear matrices of said ultrasound probe; and
calculating at least a first 3D image of the sample based on a plurality of 2D images, wherein the plurality of 2D images are calculated based on converted signals resulting from the detection of the backscattered acoustic waves by the transducers of each of said plurality of linear matrices.

In some embodiments, emitting acoustic waves in the sample (i.e. insonifying the sample) may be done simultaneously by the transducers of all the linear matrices of the plurality of linear matrices. However, depending on the electric connections between the probe and the electronic bay, insonification of the sample by the transducers may also be done sequentially.

According to one or further embodiments, the steps of emitting acoustic waves and detecting backscattered acoustic waves are performed during an observation time greater than a predetermined minimum observation time, and the calculated 2D images are time-varying 2D images. Such time-varying 2D images enable flows imaging, e.g. blood flows imaging. In particular, functional ultrasound imaging of a sample may be achieved by studying time variations of such blood flow images.

The predetermined minimum observation time depends on the dynamics of the phenomenon to image and may for example be equal to about 10 ms.

Emitting the acoustic waves and detecting the backscattered acoustic waves during an observation time at least equal to the predetermined minimum observation time enables calculating 3D images varying with time and therefore enables flows imaging, e.g. blood flows imaging, required for functional ultrasound imaging.

As a matter of example, the applicant has shown that an observation time comprised between about 200 ms and about 400 ms is appropriate for imaging blood flows in order to achieve functional ultrasound imaging of the brain of living animals, for example rodents.

The applicant has shown that an observation time comprised between about 800 ms and about 1.2 seconds is appropriate for imaging blood flows in order to achieve functional ultrasound imaging of a human brain.

In the present description, the steps of emitting acoustic waves and detecting backscattered acoustic waves to calculate a 2D image is referred to as an "acquisition step" of said 2D image.

According to one or further embodiments, acquisition of the 2D images of one plurality of 2D images by the plurality of linear matrices is performed within a predetermined maximum time. Said predetermined maximum time may be substantially equal to said observation time.

According to one or further embodiments, said predetermined maximum time is inferior to a coherence time, advantageously inferior to half of such coherence time, between the acoustic waves backscattered by the transducers of each of the plurality of linear matrices.

According to one or further embodiments, the coherence time is equal to about 3 seconds.

When 2D images of different areas of the sample are acquired within said coherence time, it is possible to measure the functional connectivity of the sample between said different areas.

According to one or further embodiments, the at least first 3D image based on the plurality of time-varying 2D images, is a time-varying 3D image. Therefore, when the observation time is strictly greater than the minimum observation time, it is possible to generate so-called "4D images", i.e. a sequence of 3D images evolving with time. It is thus possible to perform 3D functional ultrasound imaging.

According to one or further embodiments, the method further comprises translating the mount of the ultrasound probe in a direction substantially parallel to said second direction; and wherein:
  the steps of emitting acoustic waves and detecting backscattered acoustic waves are repeated with the mount in different positions; and
  the at least first 3D image of the sample is based on the plurality of 2D images calculated using the converted signals resulting from the detection of the backscattered acoustic waves by the transducers of each of said plurality of linear matrices in the different positions of the mount.

It is thus possible to generate 3D images having fewer blind spots, or even "dense" 3D images with no blind spots.

According to one or further embodiments, the mount is translated in order to define a plurality of discrete positions. In preferred embodiments, said plurality of positions is determined such that a translating time between two subsequent positions is less than a maximum translating time.

For example, the maximum translating time is equal to about 1 s, advantageously equal to about 500 ms, advantageously equal to about 200 ms. This may involve for example that the mount is translated and stopped in different positions both on the outward and return way.

As a matter of fact, the applicant has shown that due to the decelerating/accelerating time of the translation stage used to translate the mount, there is a minimum time to translate the mount from one position to another position, even when the positions are close to each other. In it thus advantageous to keep subsequent positions of the mount within a distance that doesn't increase the translating time above such minimum translating time.

In other embodiments, the plurality of positions of the mount may be determined randomly or the translation of the mount may be continuous.

According to one or further embodiments, the calculation of said at least first 3D image comprises a correction of a time delay between 2D images calculated for different positions of the mount. Such time delay may be calculated using the translating time and the time of acquisition of a 2D image, i.e. the time for emitting and detecting the backscattered acoustic waves used to generate a 2D image.

The above method thus enables, in some embodiments, measuring connectivity of the brain by measuring 3D dense images, i.e. without blind spots, using 2D images, wherein all said 2D images are acquired with a rate, i.e. a "volume rate", superior or equal to about 0.3 Hz. A time correlation between the acoustic waves backscattered by the brain and detected by the transducers of each of the linear matrices is thus maintained. Obviously, the volume rate may be superior to 0.3 Hz when the 3D images are not "dense", i.e. when the blind spots are acceptable.

BRIEF DESCRIPTION OF DRAWINGS

Other advantages and features of the invention will become apparent on reading the description, illustrated by the following figures which represent:

FIG. 6A is a diagram illustrating blood flow images of a mouse brain obtained using an ultrasound probe according to the present description, wherein the ultrasound probe is static, at different acquisition times;

FIG. 6B is a diagram illustrating a functional connectivity matrix between regions of interest as shown in FIG. 6A;

DETAILED DESCRIPTION

Figure 1:
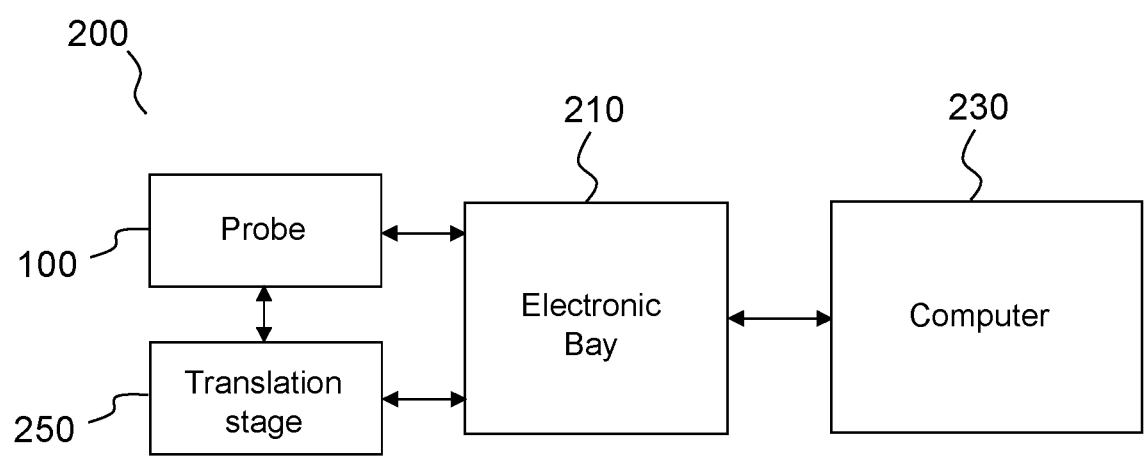
FIG. 1 schematically illustrates an apparatus for ultrasound imaging of a sample according to an embodiment of the present description.

FIG. 1 illustrates an apparatus for ultrasound imaging of a sample according to the present description, e.g. an apparatus configured to implement fUS imaging.

The apparatus 200 generally comprises an ultrasound probe 100, an electronic bay 210, a computer 230 and an (optional) translation stage 250.

The probe 100 is configured to emit acoustic waves into a sample and detect acoustic waves that are back-reflected by the sample.

The probe is further configured to generate analog electrical signals from the detected acoustic waves and transfer the analog electrical signals to the computer 230 via the electronic bay 210. The electrical signals that are generated by the probe may be analog, whereas the signals processed by the computer may be digital. Therefore, the electronic bay 210 may perform an analog to digital conversion of the electrical signals so that they are readable and processible by the computer 230.

The computer 230 is configured to acquire the electrical signals from the electronic bay 210 and process the electrical signals to generate images of the sample, for example images of slices of the sample (i.e. 2D images).

The translation stage 250 is configured to move the probe 100 or parts of the probe 100 so that the apparatus can generate images of different parts of the sample. In some embodiments, the translation stage may be incorporated in the probe itself.

Figure 2:
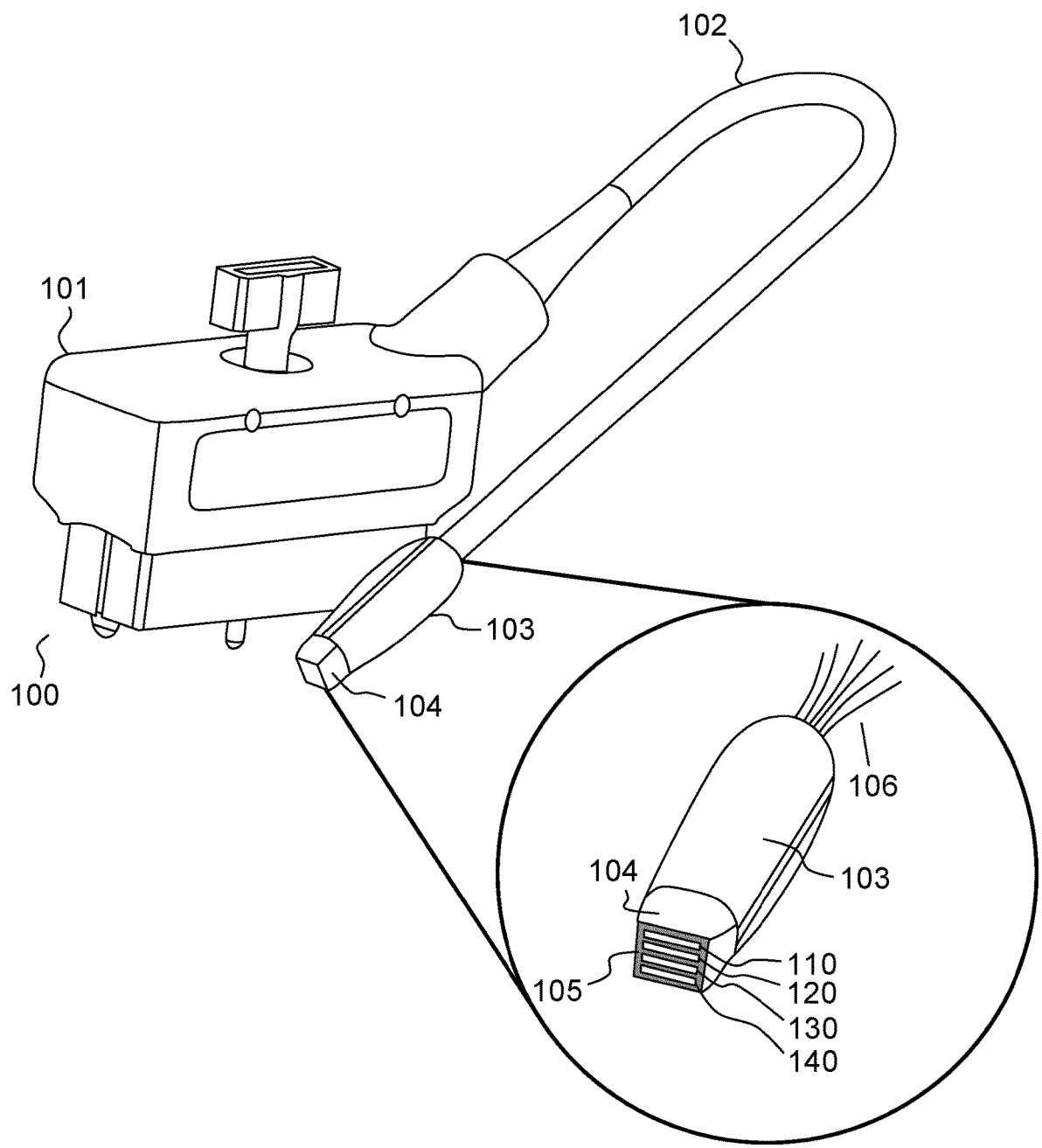
FIG. 2 schematically illustrates an ultrasound probe according to an embodiment of the present description.

FIG. 2 illustrates an example of an ultrasound probe 100 according to an embodiment of the present disclosure.

The ultrasound probe 100 comprises a connector 101, a connector cable 102 and a probe head 103.

The probe head 103 comprises a mount 105, located in a tip part 104 of the probe head 103 and a plurality of linear matrices of transducer elements (hereafter "transducers") fixed on the mount 105.

In the exemplary embodiment shown in FIG. 2, four linear matrices (110, 120, 130, 140) of transducers are fixed on the mount 105. However, the probe could comprise more or less linear matrices, e.g. between 2 and 12, advantageously between 2 and 8, for example between 4 and 8.

The probe head emits acoustic waves towards the sample via the linear matrices and converts the acoustic waves back-reflected by the sample into electrical signals that are sent to the connector 101 via the electric wires 106.

The probe head 103 is electrically connected to the connector 101 through electric wires 106 comprising conductive material. The electric wires 106 may be protected by a connector cable 102 in order to avoid any disturbance from the environment.

In some embodiments, the linear matrices may be independently electrically connected to the connector. However, a multiplexer (or "MUX") configured to multiplex the emitted and/or received signals to and from the transducers may be arranged in the electronic bay or in the probe.

Figure 3:
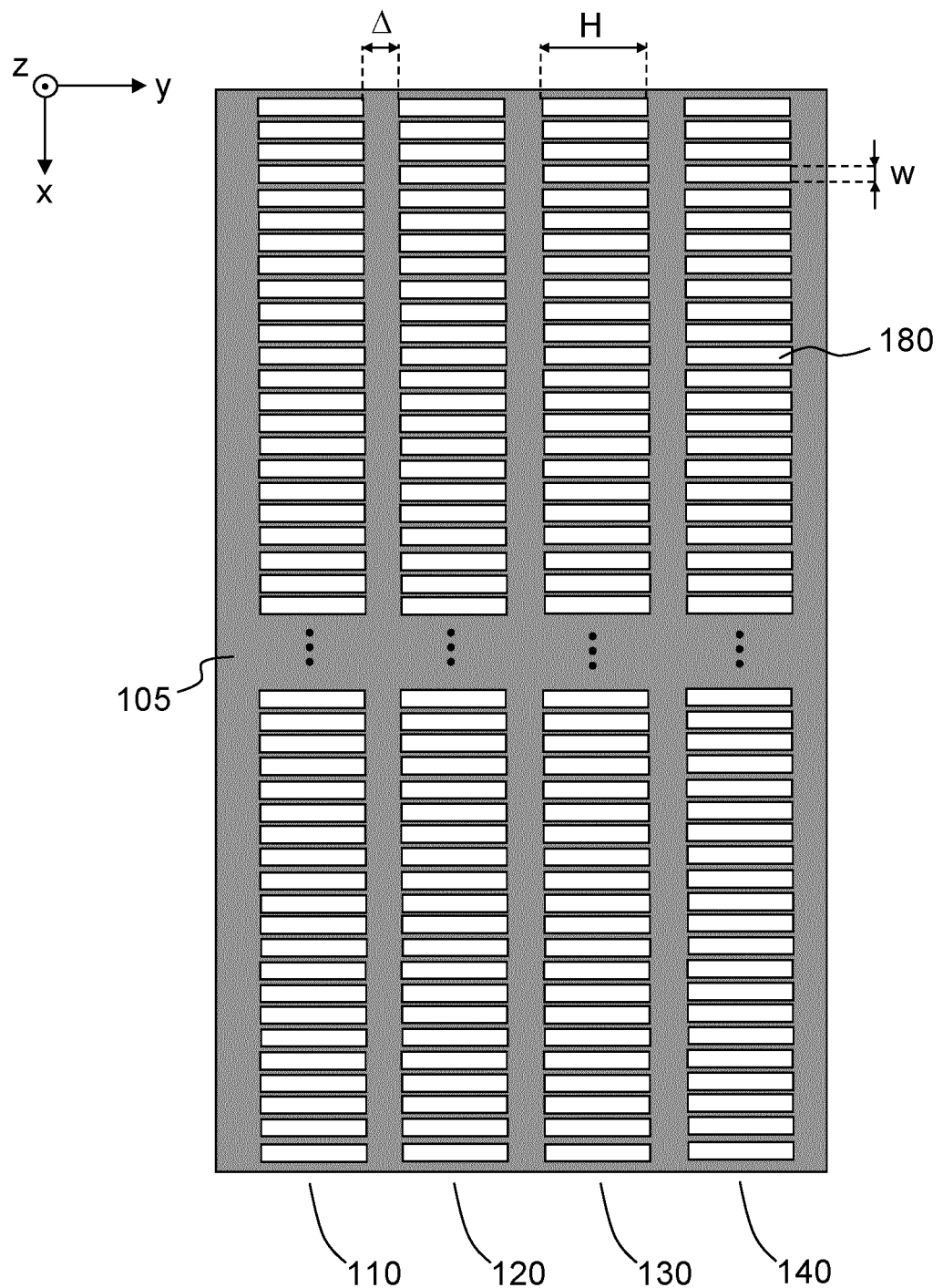
FIG. 3 schematically illustrates linear matrices of transducers in an embodiment of an ultrasound probe according to the present description.

FIG. 3 schematically illustrates four linear matrices (110, 120, 130, 140) of transducers in an example of an ultrasound probe according the present description.

As shown in FIG. 3, each linear matrix in this example has a shape of a rectangular continuous or discontinuous strip of transducers 180, with a first side along a first direction x and a second side along a second direction y, wherein x, y and z form three axes of a right handed Cartesian coordinate system. The second side is smaller than the first side. By discontinuous, it is understood that the transducers need not to be in contact with each other but can be spaced by a predefined length.

The transducers can be independently controlled in order to each emit an acoustic wave with a predefined delay with respect to the emission by the other transducers. By tuning such delays, it is possible to use interference between the acoustic waves to form a collective acoustic wave that can be selectively focused at points of a plane of the sample. Such technique is well known in the art as "Coherent Compound Beamforming" and described for example in G. Montal do et al., "*Coherent plane-wave compounding for very high frame rate ultrasonography and transient elastography*", IEEE transactions on ultrasonics, ferroelectrics, and frequency control, 56(3), 489-506 (2009).

Each linear matrix can then be used to image a slice of the sample, wherein a slice is defined in a plane comprising the first direction x and the third direction z, the third direction z being the direction along which is defined a depth within the sample. Such image of a slice is referred to a "2D image" in the present description.

Therefore, in the example of FIG. 3, four slices of the sample are imaged at each insonification of the sample. To acquire such four images, the four linear matrices may insonify the sample simultaneously or sequentially, especially when a multiplexer is used.

The linear matrices are arranged substantially parallel to one another according to the first direction (x) and a pair of juxtaposed linear matrices is separated by an inter-distance $\Delta$. When a probe comprises more than two linear matrices, the inter-distances between contiguous linear matrices of all pairs of contiguous linear matrices may be the same.

A non-zero inter-distance will cause the images of the slices acquired for one position of the probe to form a discontinuous 3D image of the sample comprising blind spots, i.e. parts of the sample that are not imaged but comprised between parts of the sample that are imaged.

In order to obtain a "dense" 3D image with no blind spots, or at least a 3D image of the sample with less blind spots, it may be useful to acquire images of the sample for a plurality of positions of the mount that supports the linear matrices of transducers.

Advantageously, the acquisition time (or observation time) in each position, i.e. the time required to insonify the sample and detect the backscattered acoustic waves to produce a 2D image, is greater than a predetermined minimum observation time required for functional ultrasound imaging, e.g blood flows mapping, that requires calculating 3D images at different times. Such predetermined minimum observation time may be equal to around 10 ms.

On the other hand, the number of positions and the observation time in each position may be such that the total time required to generate the 3D images is less than a predetermined "coherence time", so that the 3D images may be used to measure the brain functional connectivity.

In a probe according to the present description, the inter-distance $\Delta$ between two juxtaposed parallel linear matrices can be advantageously set to a value inferior to about 30 times the central wavelength, advantageously inferior to about 20 times the central wavelength, for example about 3 mm for a central wavelength equal to about 0.1 mm (respectively about 2 mm).

Therefore, for one position of the probe according to the present description, it is possible to obtain a 3D image in which the size of the blind spots is reduced, making it possible to image large parts of the brain with a limited number of positions of the probe, for example only two positions.

In the example as shown in FIG. 3, the transducers of each linear matrix are arranged substantially parallel to one another.

In the exemplary embodiment of FIG. 3, the transducers have a rectangular shape, with a small side (w) along the first direction x and a large side (H) along the second direction y.

In the present description, a form factor $\alpha$ of a transducer is defined as the ration between w and H according to the following formula: $\alpha = H/w$ For example, w is equal to about 0.1 mm, and more generally comprised between 0.5 and 2 times the central wavelength; H is equal to about 1.5 mm, and more generally comprised between 10 and 30 times the central wavelength.

The form factor is comprised between about 5 and about 50, for example comprised between about 5 and about 20.

The length of the sample along the first direction (x) impacts on the length of the part of the sample that can be imaged for a given position of the probe, i.e. the field of view of the probe. Therefore, for given transducer sides (w, H), the larger the number of transducers, the larger the field of view.

Although it can be interesting to increase the field of view (and therefore the size of the images) by increasing the number of transducers in the probe, this also increases the number of electric wires required to connect each transducer to the connector 101 shown in FIG. 2. The applicant found that a tradeoff in the number of transducers may be between 20 and 300, for example between 60 and 150 transducers.

Figure 4:
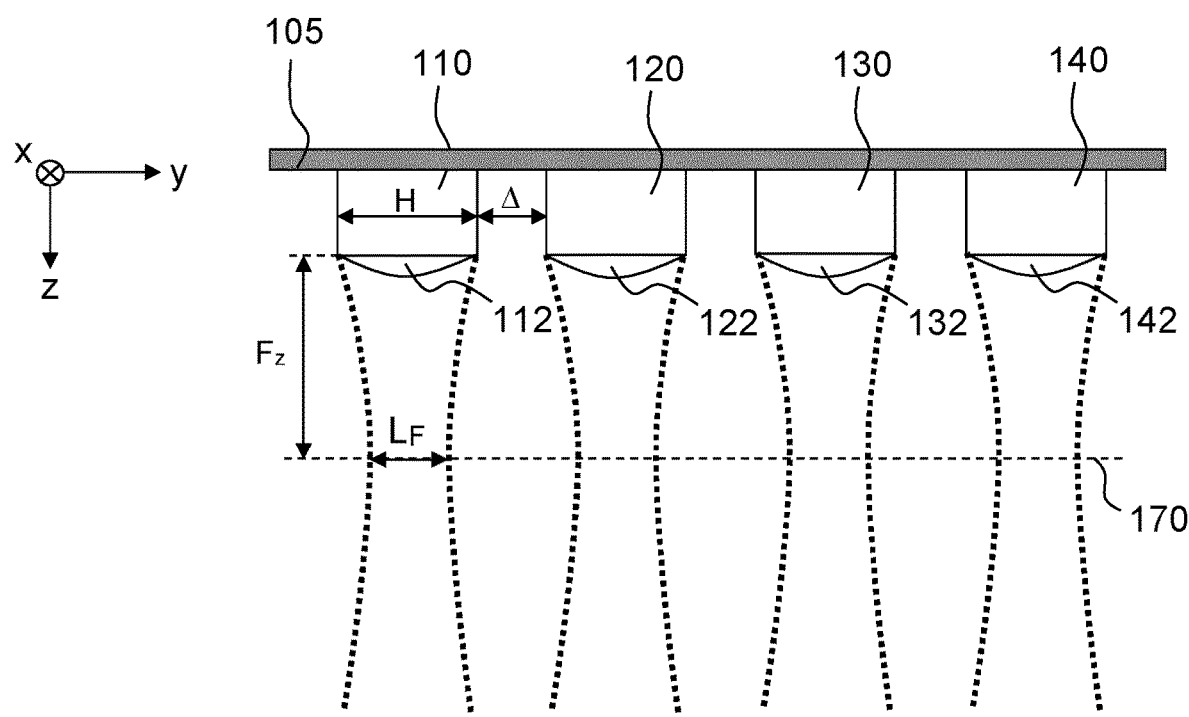
FIG. 4 schematically illustrates a close-up view of a tip part of an ultrasound probe according to an embodiment of the present description.

FIG. 4 illustrates a close-up view of a tip part of an ultrasound probe according to an example, represented in the plane defined by the second direction y and the third direction z.

As shown in FIG. 4, each linear matrix 110, 120, 130, 140 of transducers is covered with an acoustic lens, referenced respectively 112, 122, 132, 142, that is configured to focus the emitted acoustic wave in a focal plane 170 located at a focal distance $F_z$ from the linear matrix, along the third direction z. For example, the cylindrical lens comprises a cylindrical axis substantially parallel to the larger side of the linear matrix, which is the side along the first direction x.

The linear matrices 110, 120, 130, 140 of transducers may be substantially flat, meaning that the transducers of each linear matrix are arranged in a plane. However, in some embodiments, the linear matrices may be curved in a plane defined by the first direction (x) and the third direction (z) (e.g. convex linear matrices), wherein the slope of the linear matrix varies along the first direction. In this case, the transducers of each linear matrix are arranged on a curved surface and the axis of each acoustic cylindrical lens parallel to the first direction follows the curvature of said surface.

Therefore, the extent of the acoustic waves along the second direction (y) is reduced in the focal plane 170 from a length approximately equal to H (for example 1.5 mm) to an elevation length $L_F$ approximately three times smaller than H (for example 500 micrometers).

In the exemplary embodiment of FIG. 4, the cylindrical lenses have the same focal length and the focal plane 170 is common to every linear matrix, however the ultrasound probe according to the present disclosure is not restricted to this case.

Other embodiments may comprise a plurality of linear matrices that are covered with cylindrical lenses with different focal lengths. Therefore, the acoustic waves emitted by the linear matrices may be focused at different distances into the sample.

Each ensemble comprising one linear matrix and one acoustic lens allows for imaging of a section of the sample ("slice"), whose width (along the second direction) is approximately equal to the elevation length $L_F$, whose length along the first direction (x) is approximately equal to the length of the linear matrix along the first direction (x), and whose length along the third direction (z) depends, inter alia, on the size of the transducers along to the second direction (y) and the depth of the intended focusing of the acoustic waves (focal distance). The length of the section along the third direction can be comprised between about 10 times and about 200 times the central wavelength, for example equal to about 200 times the central wavelength, for example about 20 mm.

The focusing of the acoustic waves in the first direction x is not necessary because a beamforming technique may be applied in order to focus indirectly the acoustic waves at different points in the slice of the sample.

Details on the acquisition of a 2D image of a sample using a probe comprising only a single linear matrix and a single acoustic lens can be found in OSMANSKI, Bruno Félix, PEZET, Sophie, RICOBARAZA, Ana, et al. *Functional ultrasound imaging of intrinsic connectivity in the living rat brain with high spatiotemporal resolution. Nature communications,* 2014, vol. 5, no 1, p. 1-14.

The focusing of the acoustic waves avoids possible overlap between the acoustic waves emitted by different linear matrices in the different sections, that could introduce disturbance in the acoustic waves emitted in the sample. By avoiding overlap, it is meant that in each section defined a given ensemble comprising one linear matrix and one acoustic lens, the ratio between an acoustic field produced by each other ensemble and the acoustic field produced by said ensemble is less than −6 dB, advantageously less than −12 dB.

Figure 5:
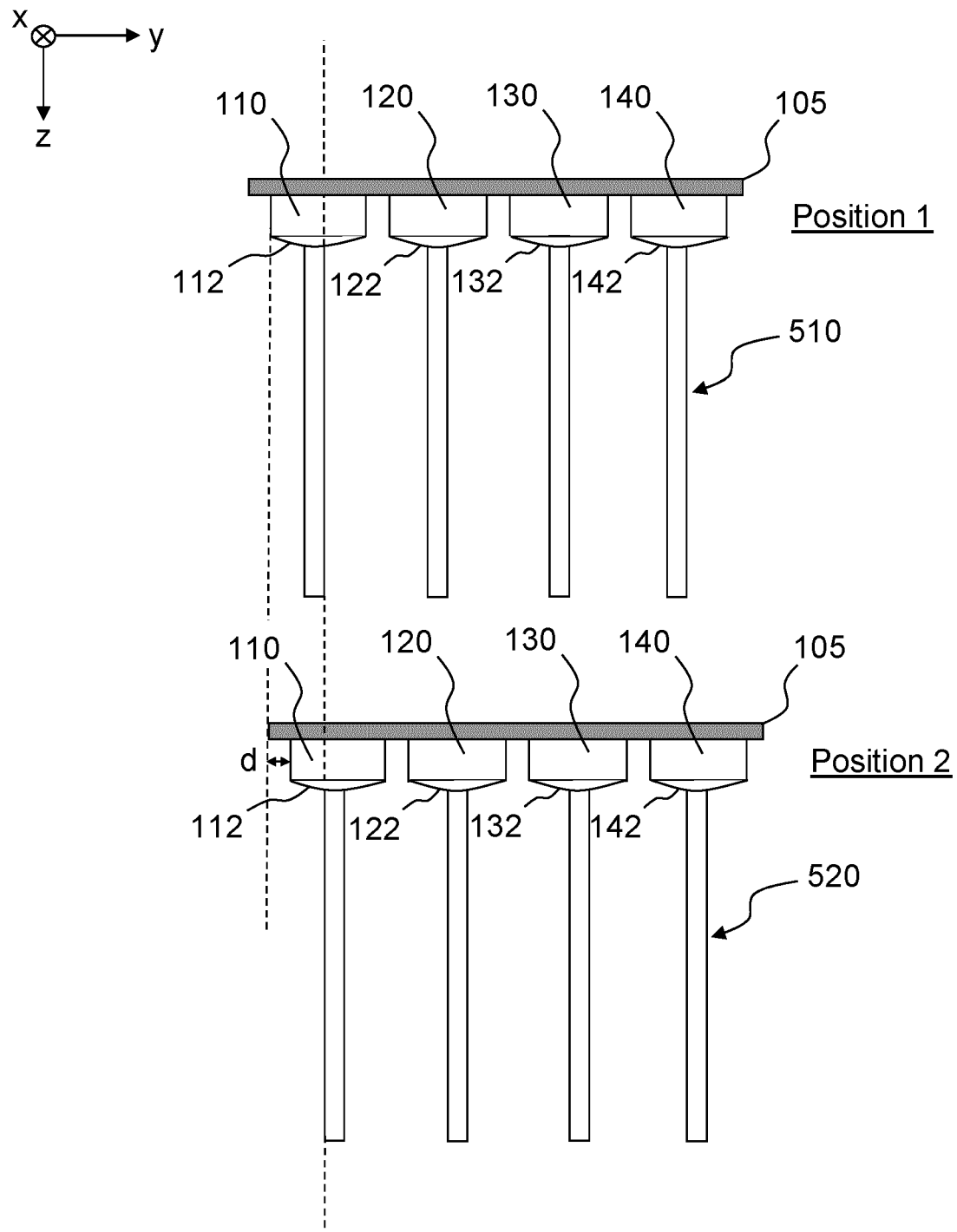
FIG. 5 schematically illustrates steps of a method of ultrasound imaging using an ultrasound probe according to an embodiment of the present description.

FIG. 5 schematically illustrates steps of a method of functional ultrasound imaging according to an example of the present description, for example for determining the brain connectivity.

The method comprises the acquisition of pluralities of 2D images with an ultrasound apparatus according to the present description, wherein the mount of the probe is translated at different positions defined along the second direction. The ultrasound probe comprises in this example four linear matrices 110, 120, 130, 140, as illustrated for example in FIGS. 3 and 4.

In a first step A, the mount is in a first position (Position 1), a first plurality of 2D images 510 is acquired by insonifying the sample and detecting backscattered acoustic waves during a given observation time. The observation time may be for example equal or greater than a minimum observation time, defined for functional ultrasound imaging. Such minimum observation time is for example equal to about 10 ms. For example, an observation time comprised between about 200 ms and about 400 ms is suitable for imaging a complete cardiac cycle of a rat or a mouse.

The first step results in the acquisition of four 2D images 510 of slices of the sample.

In a second step B, the mount is moved from the first position (Position 1) to a second position (Position 2), for example using a translation stage (250, FIG. 1).

The distance d between the first position and the second position may be chosen to be superior or equal to about $L_F$ so that two successive pluralities of slices acquired by the apparatus according to the present description correspond to different parts of the sample.

Further, the distance d between the first position and the second position may be chosen to be inferior or equal to about the sum of the length of the second side H of the linear matrices and the inter-distance Δ. This is to avoid that a first position of a first linear matrix be identical with the second position of a second linear matrix, which would provide redundant information on the sample.

The motion from the first position to the second position is characterized by a given translating time. The translating time can advantageously be inferior or equal to about 1 s, advantageously inferior or equal to about 500 ms; a smaller translating time is suitable for moving the mount at a larger number of positions, especially for measuring brain connectivity.

In a third step C, when the mount is in the second position (Position 2), a second plurality of 2D images 520 is acquired by imaging the sample during a time equal to the observation time. The observation time may be the same for all the positions of the mount or may differ depending on the position of the mount.

Consequently, after the three steps (A, B, C), images of 8 slices of the sample are acquired.

The same steps can be repeated (translating the mount to a new position, acquiring new slices) in order to acquire a large number of slices and reconstruct the whole sample to obtain a dense 3D ultrasound image of the sample.

If a measurement is such that slices are acquired for four different positions of the mount, 16 different slices of the sample may be acquired. The measurements take a total time approximately equal to the observation time (for example 200 ms) plus the translating time (for example 200 ms), multiplied by the number of positions (for example 4). Therefore, in the example above, the total time can would be equal to about 2.4 s, which is generally less than the coherence time and suitable for measuring the brain connectivity from all the slices.

The move of the mount presented in relation to FIG. 5 is exemplary and not limitative. In particular, the different positions of the mount could be chosen in different ways. For example, the positions of the mount may be defined in the way in or in the way back of the mount, thereby reducing the time required for the mount to move back to its initial position.

The pluralities of 2D images acquired at the different positions of the mount are not acquired at the same time, therefore reconstruction of the 3D images based on such 2D images may comprise a correction of the time delay between acquisition of two 2D images.

FIG. 6A illustrates experimental blood flow images (Doppler images) of a mouse brain with an ultrasound probe according to the present description when the ultrasound probe is at a fixed position, i.e., the probe is static.

The ultrasound probe used to obtain the results of FIG. 6A comprises four linear matrices of 64 piezoelectric transducers emitting acoustic waves at 15 Mhz. The size of each of the piezoelectric transducer is 0.11 mm in the first direction (x) and 1.5 mm in the second direction (y). The distance between juxtaposed linear matrices is 2.1 mm in the second direction (y) and the distance between two imaged brain slices is therefore also equal to 2.1 mm. Each linear matrix of the ultrasound probe h is covered with a cylindrical lens having a plane of symmetry orthogonal to the second direction (y) and a focal length of about 8 mm, i.e., about 80 times the wavelength of the acoustic waves emitted by the transducers.

In particular, FIG. 6A shows three series of four blood flow images of four coronal slices 610, 620, 630, 640 of a mouse brain acquired by the four linear matrices of the ultrasound probe at different acquisition times. Each series is acquired during an observation time of about 400 ms.

During the first 400 ms of the acquisition, successive 2D images of brain coronal slices are acquired at a high framerate with each of the four linear matrices the ultrasound probe. From these 2D images, four blood flow images may be processed in parallel (first row), to produce a first volume. This is particularly advantageous compared to a single blood flow image that is obtained in the case of an ultrasound probe comprising a single linear matrix.

Four new blood flow images are obtained between 400 ms and 800 ms, and four other new blood flow images are obtained between 800 ms and 1200 ms, etc.

After obtaining the four blood flow images of the four coronal slices of the brain, the acquisition process may be repeated continuously, for example over 20 minutes.

Each of the four blood flow images of a series correspond to a predetermined coronal slice in the brain. Such slices are referenced via anatomical coordinates in the elevation direction (distance from the coronal slice to the Bregma skull suture in the second direction, y) which are provided above each column. The gray level in each blood flow image indicates a specific cerebral blood volume (CBV).

In each blood flow image, several regions of interest (ROI) are manually selected and indicated with black contours. The contours are identified with respect to a location in the brain slices. In particular, the ROI of a slice can be on the left side "L" 651 or on the right side "R" 652 of the brain, and can be at the top 653 or in the middle 654 or at the bottom 655 of the brain.

FIG. 6B illustrates a resting state functional connectivity matrix calculated from the experimental data of FIG. 6A. In particular, the connectivity matrix represents the Pearson correlation coefficient for each pair of CBV time profile extracted from twenty-two regions of interest (ROI). The index of the row indicates the number of the slice and the location of the ROI. For example, "Slice3ROIMiddle L" indicates that it is the third slice (acquired with the linear matrix 630) and that the ROI is in the middle and on the left of the brain. The calculated functional connectivity matrix shows the functional connectivity between different areas of the brain.

Figure 7A:
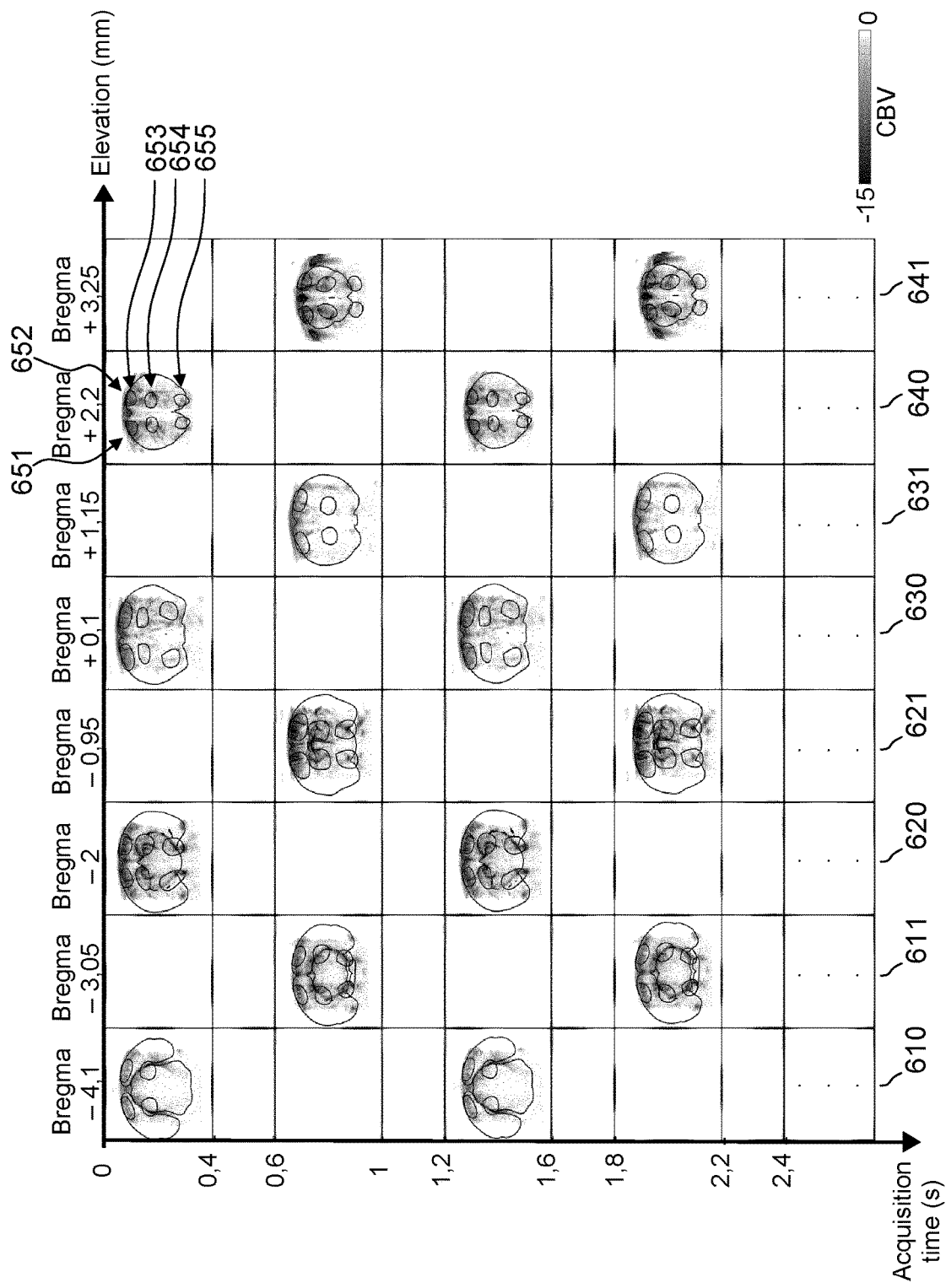
FIG. 7A is a diagram illustrating blood flow images of a mouse brain obtained using an ultrasound probe according to the present description, wherein the ultrasound probe alternates between two different positions, at different acquisition times.

FIG. 7A illustrates experimental blood flow images of a mouse brain with the same ultrasound probe as used in FIG. 6A, wherein the ultrasound probe alternates between two positions. The elevation distance between the two positions is equal to 1.05 mm (it is equal to half of the distance between two linear matrices).

During the first 400 ms, the ultrasound probe is at a first position and successive 2D images are acquired at a high framerate with each of the four linear matrices of the probe. From these 2D images ensembles, four blood flow images may be processed in parallel to produce a first volume The distance between two imaged brain slices is equal to 2.1 mm.

Then, during the following 200 ms (from 400 ms to 600 ms), the translation stage moves the ultrasound probe to a second position 1.05 mm forward in the positive elevation direction. There may be no acquisition of 2D images during the translation time.

After such motion, from 600 ms to 1 s, four new blood flow images are obtained and the field of view is therefore increased by 1.05 mm. A volume can be reconstructed from the 8 coronal slices 610, 611, 620, 621, 630, 631, 640, 641 of the two first rows.

Then, during the following 200 ms (from 1000 ms to 1200 ms), the translation stage moves the probe back to the first position.

In the example of FIG. 6B, the measurements take a total time approximately equal to the observation time (400 ms) plus the translating time (200 ms), multiplied by the number of positions (two positions). Therefore, in the example above, the total time is equal to about 1.2 s, which is less than the coherence time and suitable for measuring the brain connectivity from all the slices.

After obtaining the eight blood flow images of the eight coronal slices of the brain (four blood flow images for each position of the ultrasound probe), the acquisition process may be repeated continuously, for example over 20 minutes.

Figure 7B:
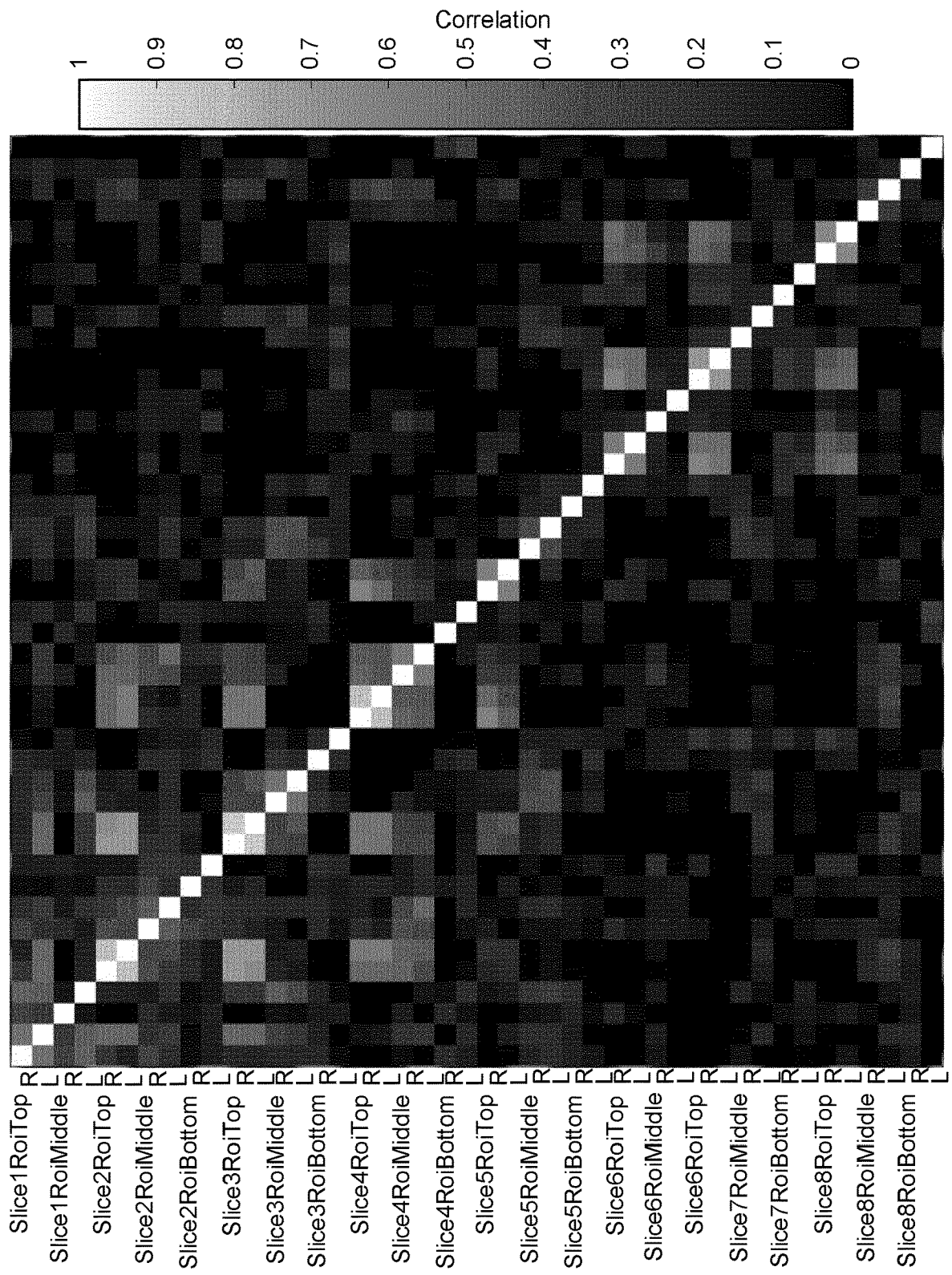
FIG. 7B is a diagram illustrating a functional connectivity matrix between regions of interest as shown in FIG. 7A.

FIG. 7B illustrates a resting state functional connectivity matrix calculated from the experimental data of FIG. 7A between 44 ROI selected among the 8 slices. Due to the acquisition of blood flow images at two different positions, there are eight imaged slices instead of four. Therefore, the size of the connectivity matrix in FIG. 7B is doubled compared to the connectivity matrix illustrated in FIG. 6B. By acquiring blood flow images at two different positions of the ultrasound probe, it is possible to reduce the size of the blind spots and thereby calculate the functional connectivity in more areas of the brain than with a single position of the ultrasound probe.

While the invention has been described with respect to a limited number of embodiments, those skilled in the art, having benefit of this disclosure, will appreciate that other embodiments can be devised which do not depart from the spirit of the invention as disclosed herein. Accordingly, the scope of the invention should be limited only by the attached claims.

The invention claimed is:

1. An apparatus for ultrasound imaging of a sample comprising:
   an ultrasound probe, wherein the ultrasound probe comprises:
   a connector;
   a probe head comprising:
   a mount located in a tip part of said probe head;
   a plurality of linear matrices of transducers configured to emit acoustic waves with a central wavelength and detect backscattered acoustic waves, said linear matrices being electrically connected to said connector,
   wherein each linear matrix from said plurality of linear matrices of transducers comprises a first side along a first direction and a second side along a second direction, said second side being smaller than said first side,
   wherein said plurality of linear matrices of transducers are fixed to said mount and juxtaposed on the mount with the first sides of the plurality of linear matrices of transducers being adjacent,
   wherein each linear matrix from said plurality of linear matrices of transducers is covered with a single cylindrical acoustic lens from a plurality of cylindrical acoustic lenses, each cylindrical acoustic lens configured to focus said acoustic waves emitted by each linear matrix, each cylindrical acoustic lens of each linear matrix comprising a cylindrical axis substantially parallel to said first direction,
   wherein each linear matrix from said plurality of linear matrices of transducers together with each cylindrical acoustic lens of each linear matrix provides an ensemble allowing for imaging of a section of the sample, the plurality of linear matrices of transducers together with the plurality of cylindrical acoustic lenses providing a plurality of ensembles,
   wherein the plurality of ensembles comprise two juxtaposed ensembles that provide an inter-distance between the two juxtaposed ensembles, and
   wherein the inter-distance is less than 30 times the value of said central wavelength; and
   a translation stage configured to translate said mount of the ultrasound probe in a third direction substantially parallel to said second direction, by a distance less than or equal to the sum of the inter-distance between the two juxtaposed ensembles and a length of a transducer along the second direction.

2. The apparatus as claimed in claim 1, wherein the cylindrical acoustic lenses of two juxtaposed linear matrices among the plurality of linear matrices of transducers are designed such that there is substantially no overlap between acoustic waves emitted by said two juxtaposed linear matrices in focal planes of respectively said cylindrical acoustic lenses.

3. The apparatus as claimed in claim 1, wherein said plurality of cylindrical acoustic lenses have a focal distance equal to a value comprised between about 10 times and about 200 times the value of said central wavelength.

4. The apparatus as claimed in claim 1, wherein:
   the transducers of each of said plurality of linear matrices have a rectangular shape with a form factor between about 5 and about 50, wherein said form factor is a ratio of the length of a transducer along the second direction to the length of a transducer along the first direction, and are arranged in a discontinuous strip extending along the first direction.

5. The apparatus as claimed in claim 1, wherein each cylindrical acoustic lens comprises a plane of symmetry that is substantially orthogonal to the second direction.

6. The apparatus as claimed in claim 1, wherein each of said plurality of linear matrices comprises between about 20 and about 300 transducers.

7. The apparatus as claimed in claim 1, wherein the plurality of linear matrices comprises between 2 and 12 linear matrices.

8. The apparatus as claimed in claim 1, further comprising:
   an electronic bay configured to receive electrical signals transmitted by said connector of said ultrasound probe and generate converted signals, wherein said electrical signals result from the detection of the backscattered acoustic waves by the transducers of said plurality of linear matrices;
   a computer configured to receive the converted signals from said electronic bay and calculate imaging data from said converted signals.

9. A method for ultrasound imaging of a sample using the apparatus as claimed in claim 1, comprising:
   translating the mount of the ultrasound probe in a direction substantially parallel to said second direction, by said distance inferior or equal to the sum of the inter-distance between two juxtaposed ensembles and a length of a transducer along the second direction;
   emitting acoustic waves and detecting backscattered acoustic waves using the transducers of the plurality of linear matrices of said ultrasound probe, wherein emitting the acoustic waves and detecting the backscattered acoustic waves are repeated with the mount in different directions; and
   calculating at least a first 3D image of the sample based on a plurality of 2D images,
   wherein the plurality of 2D images are calculated based on converted signals resulting from the detection of the backscattered acoustic waves by the transducers of each of said plurality of linear matrices in the different positions of the mount.

10. The method as claimed in claim 9, wherein emitting the acoustic waves and detecting the backscattered acoustic waves are performed during an observation time greater than a predetermined minimum observation time, and wherein the plurality of 2D images are time-varying 2D images.

11. The method as claimed in claim 10, wherein emitting the acoustic waves and detecting the backscattered acoustic waves to calculate the plurality of 2D images are performed within a predetermined maximum time.

12. The method as claimed in claim 11, wherein said predetermined maximum time is substantially inferior to a coherence time equal to about 3 seconds.

13. The method as claimed in claim 9, wherein:
the mount is translated in order to define a plurality of positions; and
said plurality of positions is determined such that a translating time between two subsequent positions is less than a maximum translating time.

14. The method as claimed in claim 9, wherein calculating the at least first 3D image further comprises performing a correction for a timing delay between 2D images calculated for different positions of the mount.

15. The method as claimed in claim 9, wherein a plurality of 3D images of the sample are calculated with a framerate superior or equal to about 0.3 Hz to measure functional connectivity of a brain.

\* \* \* \* \*